March 7, 1961  G. A. RICHTER, JR  2,974,101
ION-EXCHANGE ASSEMBLIES AND METHODS OF TREATING LIQUIDS
Filed May 22, 1957
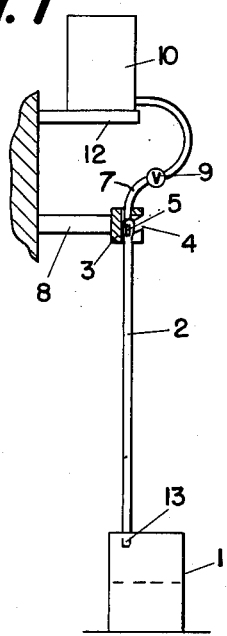
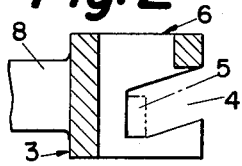
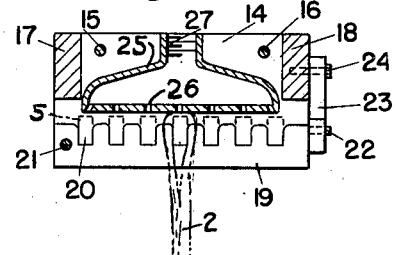
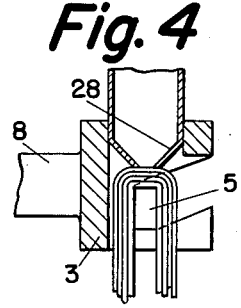
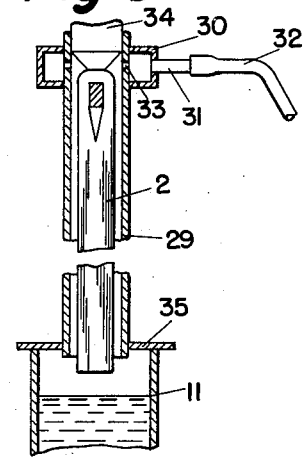
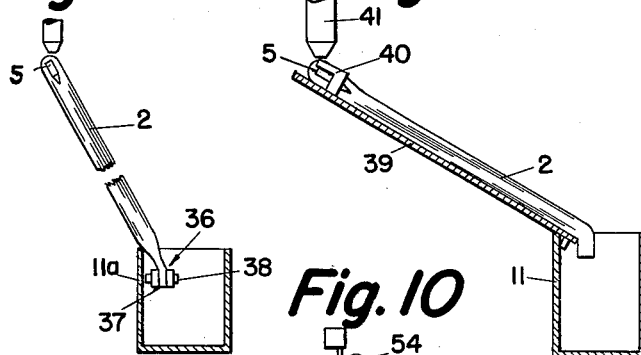
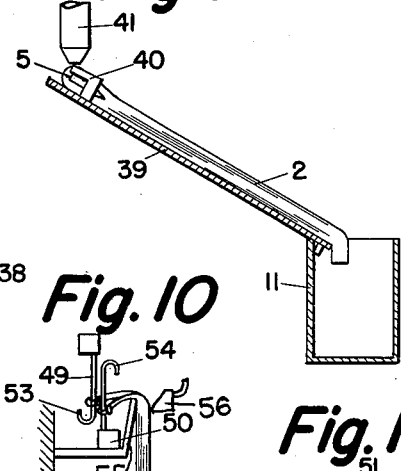
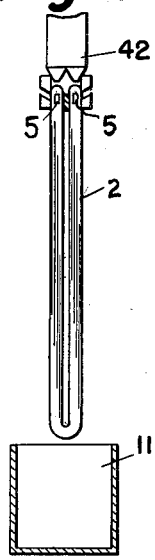
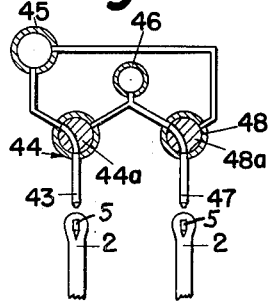
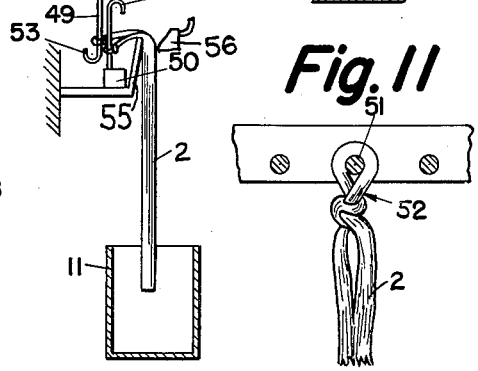
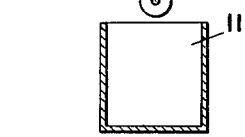

United States Patent Office 2,974,101
Patented Mar. 7, 1961

2,974,101

ION-EXCHANGE ASSEMBLIES AND METHODS OF TREATING LIQUIDS

George A. Richter, Jr., Abington, Pa., assignor to Rohm & Haas Company, Philadelphia, Pa., a corporation of Delaware Filed May 22, 1957, Ser. No. 660,975

22 Claims. (Cl. 210—37)

This invention relates to new and improved ion-exchange assemblies and to methods of treating liquids therein. It is particularly concerned with ion-exchange assemblies which comprise filamentous structures which are formed of, or carry on the fibers or filaments thereof, ion-exchange materials and especially synthetic resins having ion-exchange groups.

Heretofore ion-exchange has been carried out by passing a liquid to be treated through a container supplied with the ion-exchange material therein most commonly in the form of bead-shaped resins. The use of such assemblies is frequently accompanied with a channelling of the liquid through portions thereof so that tless efficient contact between the liquid and the ion-exchange material occurs in such portions. When the size of the beads or other particles is reduced or their construction is such that fewer and smaller voids are present in the mass of exchange material, either the rate of treatment is reduced or higher pressures are required in order to maintain the desired rate of treatment. Smaller beads and greater compaction of the exchange material also has limited application when the liquid to be treated contains suspended matter therein. Such suspensions or slurries tend to rapidly clog the systems and especially those with small bead size or close, compact masses of exchange material.

It is an object of the present invention to provide an ion-exchange assembly which is more efficient in its action than the exchange masses or assemblies used heretofore. Another object is to provide an ion-exchange assembly in which little or no channelling can occur with resultant improvement in efficiency and greater rate of flow. Another object is to provide an ion-exchange assembly which cannot build up back-pressures and which tends to automatically open up to facilitate the flow of suspensions or slurries. Another object of the invention is to provide a system which is adapted to be regenerated by simple expedients whether the assembly is composed of a single type of ion-exchange material or whether it comprises a mixture of cation-exchange and anion-exchange materials. Other objects and advantages of the invention will be apparent from the description hereinafter.

In accordance with the present invention, the objects are accomplished by the use of an assembly of filamentous structure, the filaments thereof being composed of ion-exchange material or carrying on their surfaces ion-exchange materials. The liquid to be treated is directed to the filamentous assembly and flows by gravity to a point of the assembly below the point of application where it is discharged.

The filamentous system may be formed of a bundle or tow of continuous filaments, each of which extends the full length of the bundle. Strand-like or rope-like bundles may also be formed of either fibers or staple fibers such as from fibers having a length of ¼ inch to 12 inches or more, but preferably of at least 1 inch or more in length. Such rope-like structures require the use of some form of binder to adhere the fibers together so that the flow of the liquid does not disintegrate the structure. The form of the binder will be discussed more in detail hereinafter. Such fibrous bundles as rovings and slivers formed on the conventional textile machinery may be employed. In addition, the filamentous structure may take the form of fabric, woven, knitted, braided, knotted, or felted, or it may take the form of a web, mat or batt or other type of so-called "non-woven" fabric. The latter structures may be suitably formed by conventional equipment such as on carding machines and, if desired, a plurality of carded webs may be superimposed. They may also be formed by deposition from an air-system. In all of such structures it again becomes necessary to provide a suitable binder to hold the fibers together to prevent the washing action of the liquid from disintegrating the structure.

Besides having the filaments in parallel relationship in the filamentous structure twisted double about one another, they may be braided together and they may be formed of twisted plies in the form of a cord. If desired, a single core of filaments may be employed to reinforce one or more groups of filaments twisted thereabout. When a woven fabric is employed, one preferred embodiment is that in which relatively large or heavy warp yarns are held together by light-weight weft yarns widely-spaced apart, and in this invention it is generally preferred to have yarns of relatively low-twist. Such a fabric may be rolled upon itself with the warp yarns parallel to the axis of the roll to form a bundled yarn system which may be supported from one end or from the middle in a manner similar to that described hereinafter with reference to a continuous filament bundle or tow. Alternatively, such a fabric may be supported by draping it over a rod with the heavy warp yarns extending downwardly from the support.

In general it is preferred that all of the filaments or fibers from which the ion-exchange assembly is formed be either composed of a desired ion-exchange material or formed of fibers or filaments of material having no ion-exchange capacity but carrying on their surfaces such as in the form of a coating or particulate deposit any desired ion-exchange material. Examples of fibers or filaments composed of ion-exchange materials, either of cation-exchange type or of anion-exchange type, are disclosed and claimed in a co-pending application of Richter et al., Serial No. 587,925, filed May 29, 1956, now Patent No. 2,933,460, issued April 19, 1960, and the subject matter of that application is incorporated herein by reference. Besides using such fibers which are formed entirely of ion-exchange material, there may be used instead fibers or filaments of either artificial or natural character which have been coated with ion-exchange materials or have had a superficial treatment imparting ion-exchange groups to the chemical structure at the surface of the fiber or filament. Thus the filaments or fibers may be formed of cotton, wool, silk, linen, wood pulp, nylon, casein, or vinyl or acrylic resins such as from homopolymers and copolymers of vinyl chloride, vinyl acetate, acrylonitrile, ethylene, propylene, vinylidene chloride, methyl and ethyl esters of acrylic acid and methacrylic acid, as well as cellulose esters and ethers, such as cellulose acetate, ethyl cellulose, etc. Such fibers and filaments may be rendered capable of exchanging ions by impregnation with monomers comprising monomers having ion-exchange groups of any of the types mentioned hereinafter and, if desired, with diethylenically unsaturated monomers and then effecting polymerization thereof on the surface of the fibers by the use of conventional initiators, promoters, accelerators, and the like. Alternatively, a linear polymer containing ion-exchange groups may be coated on the surface of such fibers or filaments, if desired, along with a diethylenically unsaturated monomer and in the latter case further polymerization of the ion-exchange material with the monomer may be effected to render the coating of insoluble and infusible character. Alternatively, instead of coating the fibers with ion-exchange materials, the surface molecules of the fiber whether natural or synthetic may be reacted with compounds adapted to introduce ion-exchange groups into the fiber molecules at the surface thereof. For example, cotton or regenerated fibers or filaments may be reacted with acrylonitrile to cyanoethylate the cellulose molecules and this may be followed with a hydrolysis to introduce carboxylic acid groups. Alternatively, the cellulose molecule may be reacted with 2-chloroethyldiethylamine to introduce amino groups into the surface molecules of the fiber.

As mentioned hereinabove, when fibers either of short or long length are employed in the form of rovings, slivers, webs, or other non-woven fabric structures, they must be bonded together to prevent disintegration of the filamentous structure during the treatment of the liquid. Such bonding may be effected by mixing into the filamentous structure about 5% to 20% by weight of other fibers or filaments which are of potentially adhesive character. Suitable fibers of this type are those formed from thermoplastic synthetic linear polymers. After the structure has been formed into the final arrangement desired, binding of the fibers may simply be effected by rendering the potentially adhesive fibers tacky and adhesive such as by heating or by the application of a solvent therefor. On cooling or evaporation of the solvent a coherent, filamentous structure is obtained. Alternatively, a liquid adhesive may be applied to the structure as by spraying so as to bond the fibers together. This adhesive may be a solution in water of such materials as glue or a solution in an organic solvent of such materials as nitrocellulose or vinyl or acrylic resins. Alternatively, there may be used aqueous dispersions of vinyl or acrylic resins which are of suitable adhesive character and serve to bond the fibers together on drying the treated fiber structure. Examples of the latter aqueous polymer dispersions are disclosed and claimed in co-pending applications, Serial Nos. 603,831 through 603,837 inclusive, filed August 13, 1956, two of which have issued as Patents 2,931,749 and 2,923,653, and the disclosure of each of these applications is incorporated herein by reference.

When an adhesive is applied for bonding fibers in a filamentous structure of the present invention, it may be applied at any stage during the forming of the structure so as to effect intimate contact of particles of the adhesive with fibers throughout the body of the mass so as to form a uniformly bonded structure therein.

While all of the filaments or fibers of the ion-exchange assembly may be formed of ion-exchange material or may be fibers carrying ion-exchange material on their surfaces, there may also be used instead assemblies comprising any proportion of fibers having ion-exchange capacity with any proportion of other fibers which neither carry on their surfaces ion-exchange materials nor are composed of ion-exchange materials. Such assemblies may be quite useful where the ion-exchange fibers are of relatively low strength and it is desired to reinforce the filamentous structure by the inclusion of strong fibers or filaments which do not carry ion-exchange groups. Such structures require the use of a bonding technique of any type disclosed hereinabove.

The fibers or filaments of ion-exchange character that are employed in the present invention may be those having cation-exchange groups such as carboxyl groups, sulfonic acid groups, phosphoric acid groups or thiol groups, or they may be anion-exchange groups such as amine groups, quaternary ammonium groups or sulfonium groups. As will be pointed out hereinafter, the invention includes the employment of ion-exchange structures in which there are present both cation-exchange and anion-exchange groups which may be on different fibers or filaments or on the same fibers or filaments.

The filamentous structures may be suspended from one end or supported along their entire length, but a peculiar advantage of the present invention is the fact that it is unnecessary to provide a container to enclose the entire mass of the ion-exchange structure. This advantage affords a reduction in the cost of equipment needed for carrying out the process of the invention. It is merely necessary to support the filamentous structure in such a way that the liquid to be treated may be applied to the structure at a portion of its length somewhat elevated as compared to a point of the structure from which it is discharged.

The filamentous structure may take the form of an endless belt either of continuous fibers or of one or more fabrics, woven, knitted, or non-woven, and the belt may be supported about, and driven by, a pair of rolls or pulleys whose axes are spaced apart vertically. A liquid to be treated may be applied to either the upwardly moving or downwardly moving course of the fibrous belt near the upper end of the belt so that the liquid flows downwardly by gravity either concurrently or countercurrently with respect to the motion of the belt and is discharged from the bottom of the system. A pressure roll may bear against the fibrous belt in opposition to the lower pulley or roll to press out the liquid as it passes therebetween and a suitable receptacle is provided to catch the treated liquid discharged. A regenerating liquid may be applied to the upper end of the other course of the endless belt and another pressure roll may be provided near the bottom pulley or main roll to press out the excess regenerating liquid before it is carried into the liquid-treating course of the cyclic system. If desired, a washing liquid may be applied to the belt as it passes between the liquid-treatment course and the regenerating course. This washing may be further facilitated by providing three pulleys or main rolls about which the fibrous ion-exchange belt passes in a triangular or three-sided circuit, one side of which may extend horizontally, but preferably all three sides of the circuit are inclined to the horizontal by positioning one of the pulleys at an elevation intermediate those of the other two. The washing may be effected in the horizontally extending course or side of the triangle by the spraying of the washing liquid from above and providing a catch-basin therebelow. When all three sides are inclined from the horizontal, the wash liquid may be applied to the upper end of the washing course so that it flows down by gravity. In any even, separate squeeze rolls may be supplied to the opposite ends of the washing course. In a preferred arrangement, the "operating" course of the belt, in which the liquid to be treated is applied to the upper end of the course, travels downwardly to the lowermost main roll and is squeezed thereon; then the belt passes upwardly to an intermediate roll along an upwardly-inclined course to the upper end of which a regenerating liquid is applied, a second squeeze roll being applied to the bottom main roll to remove excess regenerating liquid into a container below that is separate from the container which receives the treated liquid squeezed from the operating course; and finally the belt passes around the intermediate roll and upwardly to the top main roll, near which a washing liquid is applied. Squeeze rolls may be applied to remove excess washing liquid from the belt at both ends of the washing course, and a separate container may be provided to receive the washings.

The ion-exchange structures of the present invention may be employed for the treatment of any liquid including solutions, dispersions, suspensions, or slurries. It is only necessary that the liquid be capable of flowing by gravity down the filamentous structure. The rate of flow is quite rapid but in spite of the rapidity of flow, excellent efficiency of ion-exchange is obtained presumably because of the freedom from channelling and the excellent contact obtained between the liquid being treated and the ion-exchange filaments or fibers. The linear rate of flow may be varied in several ways including the rate of application of the liquid to the filamentous assembly and the slope at which the assembly is supported.

Figure 1 of the drawing is a simple diagrammatic elevational view of one embodiment of the equipment used by the present invention.

Figure 2 is a detailed view of the fitting 3 employed in the embodiment of Figure 1.

Figure 3 shows, partly in cross section, an arrangement for supporting a plurality of filamentous structures.

Figure 4 is another embodiment of the invention employing a plurality of superimposed webs or sheets.

Figure 5 shows a modification in which the filamentous structure is supported within a cylindrical housing.

Figures 6 and 7 show modifications in which the filamentous structure is supported so that it is inclined from the vertical.

Figure 8 shows a modification in which both ends of a single filamentous structure are supported beneath the liquid distributing means.

Figure 9 illustrates an arrangement in which two ion exchange structures may be supported beneath a liquid supply system which is adapted to place one of the structures in ion-exchange relationship with the liquid to be treated while the other is being regenerated.

Figure 10 illustrates another embodiment particularly adapted to the simultaneous treatment of a liquid to remove anions and cations.

Figure 11 shows an enlargement of a detail of the embodiment of Figure 10.

Figure 1 of the drawing is a simple diagrammatic elevational view of one embodiment of the equipment used by the present invention. This equipment comprises the filamentous structure 2 such as the bundle or tow or non-woven web described hereinbefore. Means is provided for supporting the filamentous structure and in this embodiment it comprises a U-shaped fitting 3 shown in cross-section and in more detail in Figure 2. This fitting 3 is slotted at 4 on each of the 2 legs of the U to facilitate the insertion and removal of a rod or bar 5 which carries or supports the bundle. For this purpose it may simply be necessary in the case of a bundle of tow of continuous filaments to drape these filaments over the bar 5 with their midpoints on the bar so that the two ends of the bundle hang freely over the bar. The fitting 3 may be provided at its upper end with a socket opening 6 adapted to receive the lower end of a pipe 7. An arm 8 may be connected to the fitting to support it in place. The pipe 7 provides suitable means to distribute a liquid to be treated on to the upper end of the filamentous structure. A valve 9 may be provided in the pipe to control the flow of the liquid therethrough. Any suitable supply means for the liquid may be provided such as container 10 which in the particular embodiment shown is carried on a bracket 12 above the filamentous structure so that gravity flow may be relied upon to direct the liquid on to the structure. The container 10 may be open at the top or it may be closed, but if closed, suitable means is provided to vent the container or to introduce compressed air or other compressed gas to force the liquid out of the container 10. Any suitable receptacle or container 11 may be provided beneath the ion-exchange assembly to catch the liquid discharged from the bottom thereof at 13. The liquid flows rapidly down the filamentous structure without appreciable channelling and without any tendency to separate from the filamentous bundle.

Figure 3 shows, partly in cross-section, an arrangement for supporting a plurality of filamentous structures in close proximity and means for distributing liquid to be treated to the top thereof. This supporting head comprises simply front and back walls, the back wall being shown and numbered 14. These walls are held together by the bolts 15 and 16 and spaced apart by the blocks 17 and 18. On the lower ends of the opposed faces of the front and back walls there are provided a pair of plates, that on the back wall being identified by reference numeral 19. Each of these plates is provided with a series of notches 20 adapted to receive the opposite end of the rods or bars 5 (see Figure 1). The plates 19 are pivoted at 21 and have pins 22 which are adapted to be supported by the hooks 23 swingably mounted at 24. To facilitate the insertion and removal of the filamentous structures, the hooks 23 may be released from the pins 22 allowing the plates 19 to be swung about pivots 21. Between the front and back walls there is also provided distributing means in the form of a manifold 25 provided with a series of slots 26 arranged to discharge the liquid on to the upper ends of the filamentous structures. Manifold 25 may also be provided with a socket 27 adapted to receive a supply pipe such as pipe 7 as in Figure 1.

Figure 4 illustrates an embodiment in which there are draped over the bar 5 a plurality of superimposed webs or sheets of "non-woven" structure in which fibers or filaments are bonded together to provide a porous liquid-permeable structure. These webs may have any desired width extending along the length of the rod 5 and the distributing means 28 is provided with a slit or a series of perforations extending the full length of the width of the webs. Likewise the webs or sheets may hang any desired distance depending only upon their capacity to support the liquid necessarily carried thereby during the operation of the system. Lengths anywhere from two feet to fifteen feet or more may be employed for the structures so far described including those of Figures 1 through 4.

Figure 5 shows a modification in which the filamentous structure 2 is supported within a cylindrical housing 29 provided at its head with a manifold 30 which may receive a supply of inert gas through a nipple 31 and a conduit 32 connected thereto. The manifold 30 is provided with openings 33 spaced about the inside wall of the tube 29 so as to distribute the inert gas within the tube adjacent but above the upper end of the filamentous structure. The liquid distributing means 34 through which the liquid to be treated is supplied may have a diameter adapted to fit fairly snugly within the upper end of the tube 29 so as to seal this end of the system when desired. This embodiment provides a system whereby the ion-exchange treatment may be effected in an essentially closed system and, if desired, an inert gas may be introduced. When an inert gas is employed, it is generally desirable that the tube 29 have a diameter greater than that of the filamentous bundle even when expanded to its maximum extent during the liquid treatment. It is generally preferable that the liquid does not make contact with the inside wall of the tube 29 though if the tube 29 is made of a material which is sufficiently resistant to corrosion there is no objection to such contact. As in the previous embodiment a receptacle shown at 11 is placed at the bottom of the assembly to receive the liquid discharged from the filamentous column. If desired an annular gasket 35 may be more or less tightly disposed about the lower end of the tube 29 so that it rests upon the upper end of the receptacle 11.

Figure 6 discloses a modification in which the filamentous structure 2 is supported so that it is inclined from the vertical. This inclination may be anywhere from a few degrees up to as much as 89 degrees from the vertical. To prevent the bundle from slipping out of the inclined position in which it is disposed with its lower end over the side of the container 11a, a weighted clamp 36 comprising two spaced bars 37 secured on opposite sides of the filamentous structure by bolts 38 may be provided. Naturally the greater the inclination of the structure 2 away from the vertical, the heavier the weighted clamp assembly 36 must be to prevent the structure from being pulled over the side of the receptacle during the flow of the liquid down the bundle 2. The weighted clamp 36 also serves to provide additional tension which can be controlled to limit to any desired extent the opening up of the bundle during the flow of the liquid through the system.

Figure 7 shows another modification in which a filamentous structure 2 is supported on an inclined plate or apron 39. At the upper end of the plate 39 at each side of the filamentous structure there are provided hooks 40 to receive the rod or bar 5 about which the filaments, webs, or the like are draped as in the previous embodiment. Liquid distributing means 41 is also provided for directing the liquid to be treated to the upper end of the filamentous structure. As before, a receptacle 11 is provided to receive the liquid discharged.

Figure 8 shows a modification in which both ends of a single filamentous structure 2 are supported beneath the liquid-distributing means 42 and above a receptacle 11. A clamp such as that shown at 36 in Figure 6 may be employed at the upper end of any of the assemblies so far described, particularly in those which are inclined from the vertical as in Figures 6 and 7.

In any of the systems so far described, regeneration of the ion-exchange material may be effected in several ways after its capacity has been surfeited. For example, in Figure 1 the liquid to be treated may be turned off by closing the valve 9 and a regenerating liquid may be applied to the upper end of the filamentous structure until regeneration has been completed. During such regeneration, of course, another receptacle should be employed to receive the liquid discharged. Alternatively when regeneration becomes necessary the filamentous structure 2 may be simply taken out of position by lifting the rod 5 supporting it out of the slot 4 in the fitting 3 and, if desired, another fresh or regenerated ion-exchange assembly may be introduced into the system. This replacement of the exhausted structure with a fresh ion-exchange structure can be effected very quickly and the exhausted assembly or structure may be regenerated while being supported in another suitable fitting. Instead the exhausted structure may simply be soaked in a container of regenerating liquid.

Various systems may be employed for effecting simultaneous ion-exchange and cation-exchange. For example, in Figure 3, alternate bars or slots 20 may be provided with filamentous structures having anion-exchange capacity and the intervening slots may be provided with filamentous structures having cation-exchange capacity. Upon exhaustion of one or the other, it is merely necessary to lift out the several structures and because each is supported on a separate bar 5 they can easily be separated into groups so that the anion structures may be regenerated in one system and the cation-exchange structures may be regenerated by another system.

Figure 9 illustrates an arrangement in which two ion-exchange structures may be supported beneath a liquid supply system which is adapted to place one of the structures in ion-exchange relationship with the liquid to be treated while the other is being regenerated. Simply stated, as diagrammatically shown, the distributing pipe 43 is connected to a three-way valve 44 which is in turn connected to a supply pipe 45 for the liquid to be treated and a supply pipe 46 for the regenerating liquid. Above the other filamentous structure there is also provided a distributing pipe 47 connected to a three-way valve 48 which is in turn connected to the supply pipe 46 for the regenerating liquid and to the supply pipe 45 for the liquid to be treated. In the position shown the cores 44a and 48a of the three-way valves or cocks are turned to direct the liquid to be treated to the filamentous structure on the left and the regenerating liquid to the filamentous structure on the right. When the ion-exchange capacity of the structure on the left is exhausted it is merely necessary to turn the valve 44 to connect supply pipe 46 for the regenerating liquid to the pipe 43. Additional valves may be provided in pipes 43 and 47 so that the supply of either the regenerating liquid or the liquid to be treated may be cut off in that pipe whenever desired.

Figure 10 illustrates another embodiment particularly adapted to the simultaneous treatment of a liquid to remove anions and cations in which there is provision for heterogeneous distribution of the two types of ion-exchanging structures while at the same time enabling a rapid separation of the different types of structures for subsequent regeneration in separate systems. In this embodiment means is provided for supporting a plurality of filamentous structures of ion-exchanging capacity. Another means is provided for supporting another set of ion-exchange filamentous structures and these two means are adapted to be juxtaposed to place the filamentous structures of one set in proximity and alternating relation with the structures of the other set. As shown in Figure 10 the assembly comprises two combs 49 and 50. A plurality of filaments making up one structure is looped about a reed of one comb, and tied on the other side of the reed as illustrated in Figure 11 where the reed is indicated at 51 and the knot at 52. Each of the reeds of a comb which may have any length desired may be provided with a similar group of filaments looped and tied thereabout. The other comb may have its reeds provided with similar groups of filaments looped and tied thereabout and the reeds of each of the combs may be curved back as shown at 53 and 54 so that the former comb may be inserted from the vertical without the filaments dropping off. The ends of the reeds of the comb 50 may also be turned in the other direction as shown at 54 to prevent the filamentous structures carried thereon from being lifted off during the separation by vertical elevation of comb 49 with respect to comb 50. After the groups of filaments are applied to each of the respective combs they may be assembled in the manner shown in Figure 10 with the filaments from the reeds of comb 49 extending between the reeds of comb 50 and both sets of filament groups extending over the upper edge of a supporting rail 55 from which they hang together in side-by-side or overlapped relation. Means is provided at 56 for distributing the liquid to be treated to the assembly of filament bundles adjacent to their upper ends and a receptacle 11 is placed beneath the assemblage to receive the liquid discharged. By using this system after the ion-exchange capacity has been exhausted, it is merely necessary to separate the two sets of filament bundles by lifting one comb, such as 49 with its filament bundles, away from the other comb after which each may be supported in a suitable regenerated medium or they may be separately treated with a system of regenerating liquid.

*Example 1*

The system of Figure 1 is provided with a filamentous structure 2 having a diameter of about ½ inch while wet and a length of 4 feet in which the filaments are each of about 6 denier size (dry) and are formed of a weak base resin; specifically the fibers are formed as in Serial No. 587,925 from a copolymer of 65% acrylonitrile, 15% butoxyethyl acrylate, and 20% methoxymethyl vinyl sulfide which fibers are treated with a mixture of 90 parts of alcohol, 10 parts of water, 4 parts of phosphoric acid, and 0.4 part of iodine at room temperature for sixteen hours, then drying at room temperature, and curing at 150° C. (1½ hours) to effect cross-linking, followed by reaction with dimethylaminopropylamine (100%) at 115° C. for 5 hours and washing. An aqueous solution containing 0.5% hydrochloric acid can be put through the above filamentous structure at a rate of 10 gallons per cubic foot per minute, which is about five times the rate at which a similar weak base resin in bead form is ordinarily recommended to be used. The column capacity was 30.1 kilograins per cubic foot expressed as calcium carbonate before any leakage occurs which is markedly higher than the minimum break-through capacity normally employed with weak base resins in bead form (27 kilograins per cubic foot).

*Example 2*

The system of Figure 1 is provided with a filamentous structure 2 having a length of about 3 feet and about ½ inch diameter (measured wet and in hydrogen form) and formed of a weak acid resin, namely a fiber (of about six denier dry) formed as in Serial No. 587,925 by treating a copolymer of 65% acrylonitrile, 15% butoxyethyl acrylate, and 20% methoxymethyl vinyl sulfide with a mixture of alcohol, water, phosphoric acid, and iodine, drying and curing as in Example 1 to effect cross-linking followed by hydrolysis for 5 hours with sodium hydroxide in 50:50 (wt.) water and alcohol at reflux (using 8 ml. of 0.5N.NaOH per gram of yarn (dry)) and conversion to the hydrogen form with dilute hydrochloric acid. An aqueous solution containing 0.5% sodium hydroxide can be put through the above filamentous structure at a rate of 6 gallons per cubic foot per minute, which is about five times the rate at which a similar weak acid resin in bead form is ordinarily recommended to be used. The column capacity is about 1 milliequivalent per milliliter before any leakage occurs.

*Example 3*

The system of Figure 10 is provided with two filamentous structures each suspended from one of two intermeshed combs, both structures being about 4 feet in length (as measured from the comb to the terminus of the depending filament bundles), one structure being formed of strong base resin filaments and the other being formed of weak acid resin filaments respectively. The strong base resin filaments are obtained by quaternization of the filaments used in Example 1 above. The quaternization is effected by immersing the filaments in water in an autoclave and introducing methyl chloride under a pressure of 45 lbs. per square inch at 45° C. for about 24 hours. The weak acid resin filaments are formed as described in Example 2. A hard water containing about 500 p.p.m. of dissolved solids is put through the above filamentous structures at a rate of 4 gallons per cubic foot per minute. Water virtually free from ions and suitable for boiler feed water or similar purposes is obtained. On exhaustion the two combs and their respective fibers are separated and regenerated by eluting the strong base structures with 4% sodium hydroxide and the weak acid resin with 4% sulfuric acid. After washing the structures, they are again used to repeat the cycle.

*Example 4*

The system of Figure 1 provided with a filamentous structure comprising a knitted sleeve having a length of about 4 feet comprising a strong base fiber formed as described in Example 3. An aqueous solution containing 1% sodium chloride is put through the above knitted sleeve at a rate of 5 gallons per cubic foot per minute. Sodium hydroxide solution containing virtually no chloride ions is obtained. The operation is characterized by a sharp break-through point.

*Example 5*

The system of Figure 1 is provided with a filamentous structure 2 having a length of about 4 feet and formed of continuous filaments of a strong acid resin, namely filaments formed by treating a copolymer of 55% acrylonitrile, 25% butoxyethyl acrylate, and 20% methoxymethyl vinyl sulfide with a mixture of alcohol, water, phosphoric acid, and iodine, drying, and curing (all as in Example 1) to effect cross-linking followed by reaction with ethylene diamine (100%) at reflux for 5 hours followed by reaction with sodium bisulfite and formaldehyde (weight formaldehyde 1:1 and weight of sodium bisulfite 3:1 based on weight of the filaments) at 60° C. for several hours. An aqueous solution containing 1% sodium sulfate is put through the above filamentous structure at a rate of 4 gallons per cubic foot per minute. Sulfuric acid solution containing virtually no sodium ions is obtained. The operation is characterized by a sharp break through point.

*Example 6*

A fabric is woven with a warp of low twist continuous-filament yarns of a copolymer of 65% acrylonitrile, 15% butoxyethyl acrylate, and 20% methoxymethyl vinyl sulfide and a weft of light-weight yarns of nylon, the weft yarns being spaced apart about ¼ inch as in "tire-yarn" fabrics. This fabric is cut into 6-foot lengths (36 inch widths), and four of such pieces are treated as in Example 3 to introduce strong base ion-exchanging groups and four other pieces are treated as in Example 2 to introduce weak acid ion-exchanging groups. These fiabrics are assembled as in Figure 4 with the several pieces superimposed but with the strong-base fabrics alternating with relation to the weak-acid fabrics. A hard water containing 500 p.p.m. of dissolved solids is distributed to the top of the fabric assembly at a rate of 5 gallons per cubic foot per minute. The water discharged is practically free of ions and is suitable for boiler feedwater use or the like. On exhaustion, the strong base fabrics are separated from the weak acid fabrics and separately regenerated in the same manner as described in Example 3.

I claim:

1. A method comprising providing a filamentous structure inclined to the horizontal, said structure comprising a plurality of elements comprising filaments having ion-exchange groups at least on the surface thereof, said elements being suspended from their upper ends with their lower portions movable in lateral directions so that the filamentous structure as a whole is free to expand and contract under the influence of liquid flowing freely down the structure by gravity, directing a liquid containing ions adapted to interact with said groups to the structure at a point above the lowermost point of the structure and allowing the liquid to flow by gravity along the structure without contacting any surface surrounding the structure whereby ion-exchange occurs during such flow without building up back-pressure.

2. A method comprising providing a filamentous structure inclined to the horizontal, said structure comprising filaments having ion-exchange groups at least on the surface thereof, said filaments being suspended from their upper ends with their lower portions movable in lateral directions so that the filamentous structure as a whole is free to expand and contract under the influence of liquid flowing freely down the structure by gravity, directing a liquid containing ions adapted to interact with said groups to the structure at a point above the lowermost point of the structure whereby the liquid flows by gravity along the structure without contacting any surface surrounding the structure and ion-exchange occurs during such flow, and collecting the liquid discharged from a lower portion of the structure.

3. A method comprising providing a liquid-permeable filamentous structure comprising a bundle of filaments extending lengthwise of the bundle and having ion-exchange groups at least on the surface thereof, the length of the bundle extending downwardly at an inclination from the horizontal, said filaments being suspended from their upper ends with their lower portions movable in lateral directions so that the filamentous structure as a whole is free to expand and contract under the influence of liquid flowing freely down the structure by gravity, directing a liquid containing ions adapted to interact with said groups to the structure at a point above the lowermost point of the structure whereby the liquid flows by gravity along the structure without contacting any surface surrounding the structure and ion-exchange occurs during such flow.

4. A method comprising providing a liquid-permeable filamentous structure comprising a bundle of filaments extending lengthwise of the bundle and having ion-exchange groups at least on the surface thereof, the length of the bundle extending generally in a vertical direction, said filaments being suspended from their upper ends with their lower portions movable in lateral directions so that the filamentous structure as a whole is free to expand and contract under the influence of liquid flowing freely down the structure by gravity, directing a liquid containing ions adapted to interact with said groups to the structure at a point above the lowermost point of the structure whereby the liquid flows by gravity along the structure without contacting any surface surrounding the structure and ion-exchange occurs during such flow.

5. A method comprising providing a liquid-permeable filamentous structure comprising a plurality of webs of filaments having ion-exchange groups at least on the surface thereof, the webs being inclined from the horizontal, said webs being suspended from their upper ends with their lower portions movable in lateral directions so that the filamentous structure as a whole is free to expand and contract under the influence of liquid flowing freely down the structure by gravity, directing a liquid containing ions adapted to interact with said groups to the structure at a point above the lowermost point of the structure whereby the liquid flows by gravity along the structure without contacting any surface surrounding the structure and ion-exchange occurs during such flow.

6. A method comprising providing a liquid-permeable filamentous structure comprising a plurality of webs of filaments having ion-exchange groups at least on the surface thereof, the structure having at least one long dimension extending in a generally vertical direction, said webs being suspended from their upper ends with their lower portions movable in lateral directions so that the filamentous structure as a whole is free to expand and contract under the influence of liquid flowing freely down the structure by gravity, directing a liquid containing ions adapted to interact with said groups to the structure at a point above the lowermost point of the structure whereby the liquid flows by gravity along the structure without contacting any surface surrounding the structure and ion-exchange occurs during such flow.

7. A method comprising interspersing the members of one set of a plurality of filamentous structures comprising filaments having anion-exchange groups with those of another set of a plurality of filamentous structures comprising filaments having cation-exchange groups to provide an assembly of such structures with at least one long dimension of the structures inclined from the horizontal, said structures being suspended from their upper ends with their lower portions movable in lateral directions so that the assembly as a whole is free to expand and contract under the influence of liquid flowing freely down the assembly by gravity, directing a liquid containing ions adapted to interact with said groups to the assembly at a point above the lowermost point of the assembly whereby the liquid flows by gravity along the assembly without contacting any surface surrounding the assembly and ion-exchange occurs during such flow.

8. A method as defined in claim 7 in which the structures comprise bundles of filaments extending lengthwise of the bundle and the bundles extend generally vertically.

9. A method as defined in claim 7 comprising the subsequent steps of separating one set of structures from another and regenerating each set separately.

10. An ion-exchanging device comprising a support, a filamentous structure having its upper end only fixedly mounted in the support, said structure comprising a plurality of relatively movable elements comprising filaments having ion-exchanging groups at least on the surface thereof, said elements being suspended from the mounting on the support at an inclination from the horizontal and in a position spaced away from any surface or wall surrounding the structure whereby the structure is free to expand and contract laterally under the influence of liquid flowing freely down the structure by gravity, means for directing a liquid into contact with an upper portion of the structure for flow downwardly through and along the structure out of contact with any surface or wall surrounding the structure, and means disposed below the structure for receiving the liquid discharged by free gravity fall from the bottom of the structure.

11. An ion-exchanging assembly comprising a filamentous structure comprising a plurality of filaments having ion-exchanging groups at least on the surface thereof, a housing having an inside wall spaced from the filamentous structure even when the latter is expanded to maximum extent, means for supporting the filamentous structure in the housing at an inclination to the horizontal, the filaments having their upper ends only fixedly mounted on the supporting means and having their lower ends suspended from their upper ends whereby their lower portions are movable in lateral directions so that the filamentous structure as a whole is free to expand and contract under the influence of liquid flowing freely down the structure by gravity, means adjacent an upper portion of the housing for directing a liquid to an upper portion of the filamentous structure, and means for receiving liquid falling by gravity from the lower end of the filamentous structure.

12. An ion-exchanging assembly comprising a filamentous structure comprising a plurality of filaments having ion-exchanging groups at least on the surface thereof, a housing having an inside wall spaced from the filamentous structure even when the latter is expanded to maximum extent, means for supporting the filamentous structure in the housing at an inclination to the horizontal, the filaments having their upper ends only fixedly mounted on the supporting means and having their lower ends suspended from their upper ends whereby their lower portions are movable in lateral directions so that the filamentous structure as a whole is free to expand and contract under the influence of liquid flowing freely down the structure by gravity, means adjacent an upper portion of the housing for directing a liquid to an upper portion of the filamentous structure, and means disposed entirely below the housing for receiving the liquid discharged by free gravity fall from the filamentous structure.

13. An ion-exchanging assembly comprising a filamentous structure comprising a plurality of filaments having ion-exchanging groups at least on the surface thereof, means for suspending the filamentous structure at an inclination to the horizontal, the filaments being held to the suspending means only at their upper ends and having their lower ends suspended from their upper ends whereby their lower portions are movable in lateral directions so that the filamentous structure as a whole is free to expand and contract under the influence of liquid flowing freely down the structure by gravity, and means adjacent an upper portion of the filamentous structure for directing a liquid to an upper portion thereof.

14. An assembly as defined in claim 13 in which the filamentous structure comprises a bundle of filaments extending lengthwise of the bundle.

15. An assembly as defined in claim 13 in which the filamentous structure comprises a bundle of filaments extending lengthwise of the bundle and the bundle is suspended vertically from one end thereof.

16. An assembly as defined in claim 13 in which the filamentous structure comprises at least one liquid-permeable filamentous web.

17. An assembly as defined in claim 13 in which the filamentous structure comprises a plurality of liquid-permeable filamentous webs.

18. An assembly as defined in claim 13 in which the filamentous structure comprises at least one liquid-permeable filamentous web and the structure is suspended vertically.

19. An assembly as defined in claim 13 in which the filamentous structure comprises a plurality of liquid-permeable filamentous webs and the structure is suspended vertically.

20. An ion-exchange assembly comprising a filamentous structure comprising (1) a set of relatively movable elements comprising filaments having anion-exchanging groups at least on the surface thereof, and (2) another set of relatively movable elements comprising filaments having cation-exchanging groups at least on the surface thereof, means for suspending said sets at an inclination to the horizontal with the elements of one set interspersed with relation to the elements of the other set, the elements being held to the suspending means only at their upper ends and having their lower ends suspending from their upper ends whereby their lower portions are movable in lateral directions so that the filamentous structure as a whole is free to expand and contract under the influence of liquid flowing freely down the structure by gravity, and means for directing a liquid to an upper portion of the filamentous structure.

21. An ion-exchange assembly comprising a filamentous structure comprising (1) a set of filaments having anion-exchanging groups at least on the surface thereof, and (2) another set of filaments having cation-exchanging groups at least on the surface thereof, means for suspending said sets at an inclination to the horizontal with the filaments of one set interspersed with relation to the filaments of the other set, the filaments being held to the suspending means only at their upper ends and having their lower ends suspended from their upper ends whereby their lower portions are movable in lateral directions so that the filamentous structure as a whole is free to expand and contract under the influence of liquid flowing freely down the structure by gravity, means for separating one set from the other to facilitate separate regeneration thereof, and means for directing a liquid to an upper portion of the filamentous structure.

22. An ion-exchanging device comprising a filamentous structure comprising a plurality of movable elements comprising filaments having ion-exchanging groups at least on the surface thereof, supporting means for the filamentous structure, said supporting means comprising means engaging only the upper end of the filamentous structure and said engaging means comprising the only mechanical members engaging the filamentous structure so that the elements of the structure hang with their lower ends extending vertically downwardly under the influence of gravity and the structure is free to expand and contract laterally under the influence of liquid flowing freely down the structure by gravity, means for directing a liquid into contact with an upper portion of the structure for flow downwardly through and along the structure out of contact with any surface or wall surrounding the structure, and means disposed below the structure for receiving the liquid discharged by free gravity fall from the bottom of the structure.

References Cited in the file of this patent

UNITED STATES PATENTS

| | | |
|---|---|---|
| 2,744,840 | Daniels et al. | May 8, 1956 |
| 2,794,239 | Crawford | June 4, 1957 |

FOREIGN PATENTS

| | | |
|---|---|---|
| 953,522 | Germany | Dec. 6, 1956 |

OTHER REFERENCES

Guthrie: Ion Exchange Cottons, Ind. and Eng. Chem., vol. 42, No. 9, September 1952, pages 2187–2189.

Muendel: Continuous Ion Exchange etc., Ind. and Eng. Chem., vol. 47, No. 3, March 1955, pages 374–379.